United States Patent [19]

Gjertsen et al.

[11] Patent Number: 4,628,581
[45] Date of Patent: Dec. 16, 1986

[54] APPARATUS AND METHOD FOR PREASSEMBLING A TOP NOZZLE SUBASSEMBLY FOR A NUCLEAR REACTOR FUEL ASSEMBLY

[75] Inventors: Robert K. Gjertsen, Monroeville Boro; John F. Wilson, Murrysville, both of Pa.

[73] Assignee: Westinghouse Electric Corp., Pittsburgh, Pa.

[21] Appl. No.: 695,131

[22] Filed: Jan. 25, 1985

[51] Int. Cl.⁴ .................. B21D 39/03; B23P 17/00; B23Q 3/00; B23D 19/04
[52] U.S. Cl. .................................. 29/428; 29/400 N; 29/723; 29/238; 29/464
[58] Field of Search ................. 29/428, 464, 467, 225, 29/256, 723, 400 N, 281.1, 238

[56] References Cited

U.S. PATENT DOCUMENTS

| 2,304,927 | 12/1942 | Kane | 29/238 |
| 3,158,051 | 11/1964 | De Mart | 29/723 |
| 3,781,970 | 1/1974 | Ferdriksson | 29/238 |
| 4,539,738 | 9/1985 | Antol et al. | 29/464 |

Primary Examiner—Howard N. Goldberg
Assistant Examiner—Steven Nichols

[57] ABSTRACT

An apparatus for preassembling the components of a top nozzle into a completed subassembly for later mounting on the skeleton of a fuel assembly includes a base having a plurality of bores with spring-loaded pistons disposed in the bores for yieldably supporting extension tubes of the top nozzle. The tubes can vertically move in the bores so that all of the lower retainers on the tubes will be brought into contact with a lower surface of a lower adapter plate for uniformily supporting the plate on the tubes. Also, the apparatus includes a plurality of locating pins insertable through passageways in an upper bearing plate of the top nozzle and into the upper ends of the extension tubes for aligning and guiding the extension tube upper ends into the passageways upon movement of the bearing plate against the bias of a plurality of coil springs which surround the tubes and extend between the lower adapter and upper bearing plates. A cruciform bearing plate is placed upon the upper bearing plate and interconnected by adjustable threaded members to the base for imposing a loading force upon the bearing plate so as to draw it downward toward the lower adapter plate and place the coil springs in a state of compression therebetween and cause insertion of the tube upper ends into the passageways and within upper retainers therein for connection thereto to limit upward movement of the bearing plate. An orientation plate with alignment pins is used to ensure that the extension tubes and scallop-bearing lower retainers are in the proper radial orientation.

15 Claims, 6 Drawing Figures

APPARATUS AND METHOD FOR PREASSEMBLING A TOP NOZZLE SUBASSEMBLY FOR A NUCLEAR REACTOR FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly With Improved Top Nozzle And Hold-Down Means" by Robert K. Gjertsen et al, assigned U.S. Ser. No. 542,625 and filed 10/17/85 now U.S. Pat. No. 4,534,933.

2. "Removable Top Nozzle And Tool For A Nuclear Reactor Fuel Assembly" by Wilson et al, assigned U.S. Ser. No. 564,058 and filed 12/21/83.

BACKGROUND OF THE INVENTION

1. Field of the Invention

The present invention relates generally to fuel assemblies for nuclear reactors and, more particularly, is concerned with apparatus and method for preassembling a top nozzle as a completed subassembly for later application to the skeleton of the fuel assembly.

2. Description of the Prior Art

In most nuclear reactors the core portion is comprised of a large number of elongated fuel elements or rods grouped in and supported by frameworks referred to as fuel assemblies. The fuel assemblies are generally elongated and receive support and alignment from upper and lower transversely extending core support plates. These upper and lower core support plates are directly or indirectly attached to a support barrel which surrounds the entire core and extends between the ends thereof. In the most common configuration, the axis of the core support barrel extends vertically and the various fuel assemblies are also arranged vertically resting on the lower support plate.

Temperatures at various times within the core may vary greatly, such as, from cold shutdown to normal operating conditions. It is also a well-known fact that different materials exhibit different thermal growth characteristics. Therefore, since the materials used in the vertically extending support structures of the fuel assemblies are generally different than those used in the core support barrel, the thermal expansion of these various members in the axial or vertical direction may be quite significant, particularly, at the high temperatures found within the core and the axial length of some of the members. For these reasons, the fuel assemblies are not usually attached to the upper and lower core plates but rather are supported in a manner which permits some relative motion therebetween. The axial thermal expansion differential between the fuel assemblies and the core support barrel has been accommodated by ensuring that the axial spacing between the upper and lower core support plates is somewhat greater than the axial length of the fuel assemblies. Normally, this is accomplished by providing an axial gap or space between the top of the fuel assemblies and the upper core support plate.

Further, generally in most reactors, a fluid coolant, such as water, is directed upwardly through apertures in the lower core support plate and along the fuel rods of the various fuel assemblies to receive the thermal energy therefrom. The physical configuration of the fuel assemblies is such that the coolant may experience a significant pressure drop in passing upwardly through the core region. This pressure drop necessarily produces a lifting force on the fuel assemblies. In some instances, the weight of the fuel assembly is sufficient to over come the upward hydraulic lifting forces under all operating conditions; however, this is often not the case, particularly when the coolant density is high, as at reactor start-up, and additionally because of increasing coolant flow rates. When the hydraulic forces in the upward direction on a particular fuel assembly are greater than the weight of that fuel assembly, the net resultant force on the fuel assembly will be in the upward direction, causing the assembly to move upward into contact with the upper core plate. This upward motion of the fuel assembly, if uncontrolled, may result in damage to the fuel assembly and the fuel rods or to the upper core plate and must, therefore, be avoided.

Conventional designs of fuel assemblies include a multiplicity of fuel rods and control rod guide thimbles held in an organized array by grids spaced along the fuel assembly length. The grids are attached to the control rod guide thimbles. Top and bottom nozzles on opposite ends thereof are secured to the guide thimbles which extend above and below the ends of the fuel rods. At the top end of the assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in the fuel assembly length due to core induced thermal expansion and the like. Representative of such hold-down devices are the ones described and illustrated in U.S. Patents to Andrews et al (No. 3,379,619), Klumb et al (No. 3,770,583) and Anthony (No. 4,192,719).

One recent fuel assembly design having a top nozzle subassembly which incorporates hold-down means is described and illustrated in the patent applications cross-referenced above. The top nozzle subassembly with its hold-down means basically includes an upper bearing plate, a lower adapter plate, a plurality of guide thimble extension tubes extending between and through the plates, and a plurality of coil springs encircling the extension tubes and held in a state of compression between the plates by a pair of retainers on the extension tubes. The lower retainer is a collar attached to each extension tube below the lower adapter plate so as to limit downward sliding movement of the adapter plate along the extension tube. The upper retainer is attached on the upper end of each extension tube within a passageway in the upper bearing plate and cooperates with an internal ledge therein to limit upward movement of the bearing plate along the extension tube. The construction of the subassembly is such that the preloaded coil springs prevent upward lifting of the fuel assembly while the terminal upper end of each extension tube along with the upper retainer are permitted to reciprocate within a respective passageway of the upper bearing plate, thus allowing for thermal growth of the guide thimbles of the fuel assembly to which the extension tubes are attached when the top nozzle subassembly is applied to the fuel assembly.

While the top nozzle subassembly construction briefly described above has demonstrated its ability to provide sufficient hold-down force to prevent hydraulic lifting of the fuel assembly while allowing for changes in fuel assembly length due to core induced thermal expansion, the subassembly does contain a large number of components which must be precisely assembled together so that the subassembly will function properly when applied to the guide thimbles of the fuel assembly. Consequently, a need exists for a technique to preassemble the above-described top nozzle components into a completed subassembly which will provide the desired degree of precision in the placement of the components at their relative positions in the subassembly and compensate for normal tolerance mismatch.

SUMMARY OF THE INVENTION

The present invention provides an apparatus and method for preassembling the top nozzle components into a completed subassembly which is designed to satisfy the aforementioned needs. The present invention ensures that the many individual components of the top nozzle are precisely fitted together with ease and reliability and in a manner in which tolerance mismatches are accommodated. Also, the parts of the apparatus holding the top nozzle components together do not get in the way of other tools used to make connections between several of the top nozzle components in completing the subassembly.

Accordingly, the present invention is directed to an apparatus for preassembling a top nozzle subassembly for later mounting on a plurality of guide thimbles of a fuel assembly. The preassembling apparatus includes: (a) a base having a plurality of bores defined therein in a pattern which matches that of the guide thimbles, each of the bores being adapted to receive a lower end of one of a plurality of guide thimble extension tubes; (b) compliant means disposed in the bores of the base and being yieldable to support the extension tubes individually for vertical movement when the tubes are slidably received through respective holes being defined in a lower adapter plate in the pattern which matches that of the guide thimbles and have respective lower retainers attached thereto below the adapter plate which limit downward slidable movement of the adapter plate along the extension tubes, whereby the extension tubes are allowed to vertically move independently of one another until their respective lower retainers are brought individually into engagement with a lower surface of the adapter plate for supporting the same uniformily by all of the lower retainers; (c) locating means disposable through passageways being defined in an upper bearing plate in the pattern which matches that of the guide thimbles and extendable into upper ends of the extension tubes for aligning the passageways individually with the respective extension tubes and guiding the extension tube upper ends into the passageways when the upper bearing plate is supported on a plurality of coil springs being disposed about the respective extension tubes and on the lower adapter plate and the bearing and adapter plates are moved relatively toward one another and against the bias of the coil springs so as to compress the same; and (d) loading means operable to generate a force which causes relative movement of the upper bearing and lower adapter plates toward one another and compression of the coil springs therebetween when the bearing plate is supported on the coil springs and the aligning and guiding means are disposed through the passageways of the bearing plate and extend into the upper ends of the extension tubes, whereby the upper ends of the extension tubes are brought into the passageways of the upper bearing plate for attachment to upper retainers for limiting upward slidable movement of the upper bearing plate relative to the extension tubes and thereby holding the coil springs in a state of compression between the lower adapter and upper bearing plates.

Further, the preassembling apparatus includes orienting means disposed between the base and the lower surface of the lower adapter plate for ensuring that each of the extension tubes and its respective lower retainer are disposed in a desired radial position in which peripheral scallops on each of the lower retainers are aligned with a plurality of fuel rods of the fuel assembly surrounding each guide thimble.

The present invention is also directed to a method for preassembling the top nozzle subassembly for later mounting on the plurality of guide thimbles of the fuel assembly. The preassembling method includes the steps of: (a) yieldably supporting a plurality of guide thimble extension tubes individually at their respective lower ends for vertical movement when the tubes are slidably received through respective holes being defined in a lower adapter plate in a pattern which matches that of the guide thimbles and have respective lower retainers attached thereto below the adapter plate which limit downward slidable movement of the adapter plate along the extension tubes, whereby the extension tubes are allowed to vertically move independently of one another until their respective lower retainers are brought individually into engagement with a lower surface of the adapter plate for supporting the same uniformily by all of the lower retainers; (b) aligning individual passageways being defined in an upper bearing plate in the pattern which matches that of the guide thimbles with individual upper ends of the respective extension tubes; (c) guiding the extension tube upper ends into the passageways when the upper bearing plate is supported on a plurality of coil springs being disposed about the respective extension tubes and on the lower adapter plate and the bearing and adapter plates are moved relatively toward one another and against the bias of the coil springs so as to compress the same; and (d) generating a loading force which causes relative movement of the upper bearing and lower adapter plates toward one another and compression of the coil springs therebetween when the bearing plate is supported on the coil springs and the passageways are aligned with the respective extension tube upper ends, whereby the upper ends of the extension tubes are brought into the passageways of the upper bearing plate for attachment to upper retainers for limiting upward slidable movement of the upper bearing plate relative to the extension tubes and thereby holding the coil springs in a state of compression between the lower adapter and upper bearing plates.

More particularly, the loading force generating step includes generating a plurality of separate components of the loading force at each lateral side of the upper bearing plate such that a leveling adjustment of the position of the upper bearing plate relative to the lower adapter plate can be made concurrently as the springs are compressed between the lower adapter and upper bearing plates.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
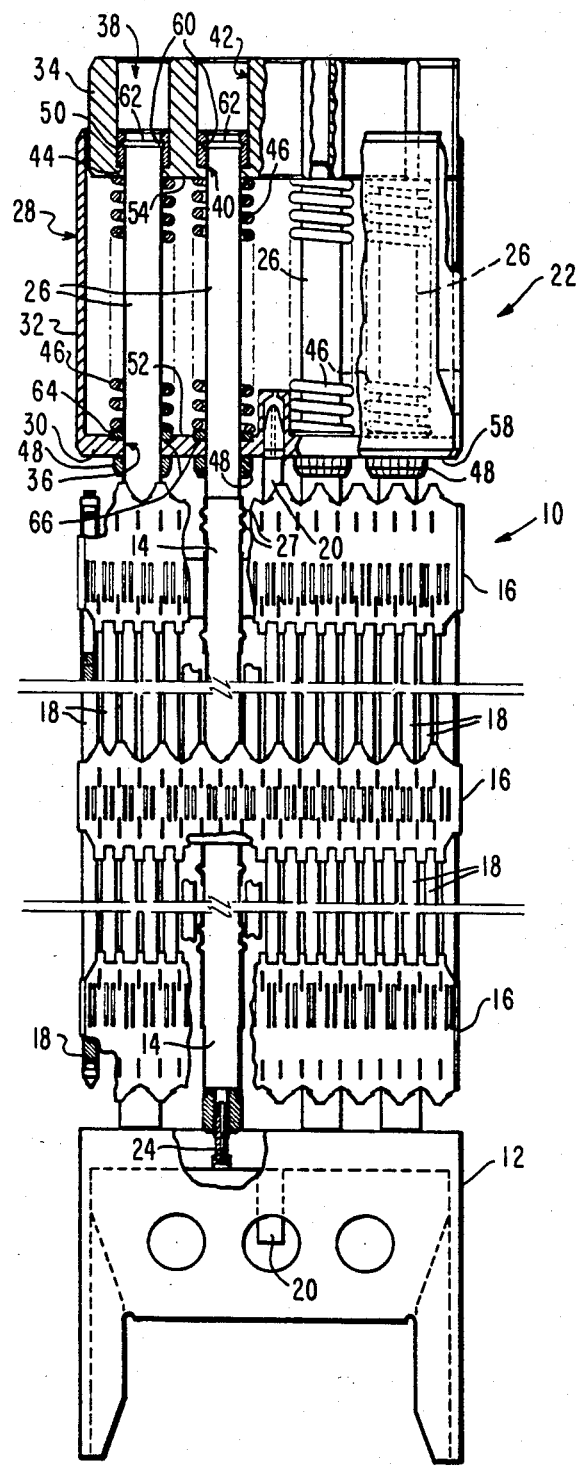
FIG. 1 is a partially sectioned elevational view, with parts being broken away for clarity, of a fuel assembly having a top nozzle subassembly preassemblied in accordance with the principles of the present invention.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown a partially sectioned elevational view, with parts broken away for clarity, of a fuel assembly constructed in accordance with well known practices and being indicated generally by the numeral 10. Basically, the fuel assembly 10 includes a lower end structure or bottom nozzle 12 for supporting the assembly on the lower core plate (not shown) in the core region of a reactor (not shown), and a number of longitudinally extending control rod guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. It should be pointed out here that although, in the illustrated embodiment, the lower ends of the elongated fuel rods 18 are shown being axially held and spaced above the bottom nozzle 12, alternatively they may be restably supported on the upper surface of the bottom nozzle 12. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

To form the fuel assembly 10, the transverse grids 16 are attached to the longitudinally extending guide thimbles 14 at predetermined axially spaced locations, and then the fuel rods 18 are inserted from below through the grids 16. Next, the lower nozzle 12 is suitably attached, such as by machine screws 24, to the lower ends of the guide thimbles 14. And, finally, the top nozzle 22, having numerous components held together in the form of a completed subassembly by the apparatus of the present invention to be described later, is attached to the upper ends of the guide thimbles 14. To control the fission process, a multiplicity of control rods (not shown) are reciprocally movable in the guide thimbles 14 of the fuel assembly 10.

In the preferred embodiment, each of the control rod guide thimbles 14 has a separate guide thimble extension tube 26 connected to the upper end of the guide thimble 14 in forming a normal extension to the guide thimble. The extension tube 26 is coaxial with the guide thimble 14, has a diameter similar to that of the guide thimble, and preferably is connected to the upper end of the guide thimble by a suitable mechanical connection, such as one or more bulge fittings 27 well known in the art.

In accordance with the present invention to be described later, the extension tubes 26 and the components of the top nozzle 22 are preassembled into a completed subassembly prior to being applied to the upper ends of the guide thimbles 14. Before describing the apparatus of the present invention for preassembling and maintaining the top nozzle 22 and extension tubes 26 as a subassembly, the components making up the top nozzle 22 and its hold-down means will first be described herein to the extent necessary to facilitate an understanding of the structure and operation of the apparatus of the present invention. However, a more thorough understanding of the top nozzle 22 can be gained from the first patent application cross-referenced above, the disclosure of which is incorporated herein by reference.

Top Nozzle With Hold-Down Means

The separate components making up the top nozzle 22 with its hold-down means (referred to hereinafter as the top nozzle for simplicity), in addition to the extension tubes 26, include an enclosure 28 being formed by a lower adapter plate 30 and a continuous upstanding sidewall 32 on the peripheral edge of the adapter plate, and an upper hold-down or bearing plate 34 slidably received within the enclosure 28. The lower adapter plate 30 is provided with a number of holes 36 therethrough corresponding to the number of extension tubes 26 needed to match with the guide thimbles 14 of the fuel assembly 10. The holes 36 slidably receive the extension tubes 26 and are spaced from one another in accordance with the desired arrangement of the extension tubes 26 when the latter are attached on the upper ends of the guide thimbles 14. The upper bearing plate 34 is of a thickness substantially greater than the thickness of the lower adapter plate 30 and is provided with a plurality of passageways 38 therethrough for receiving the extension tubes 26 also. Each passageway 38 is formed by a bore 40 and a coaxial counterbore 42 of a larger diameter than the diameter of the bore 40, with the transition therebetween defining an upwardly-facing internal ledge 44.

Other components of the top nozzle 22 include a plurality of coil springs 46 and a plurality of pairs of lower and upper retainers 48,50. The coil springs 46 correspond in number to the extension tubes 26 and are disposed thereabout between the upper surface 52 of the lower adapter plate 30 and the lower surface 54 of the upper bearing plate 34. The pairs of lower and upper retainers 48,50 are attached respectively to the extension tubes 26 relative to the lower adapter and upper bearing plates 30,34 so as to hold the coil springs 46 in states of compression therebetween.

More particularly, each lower retainer 48, being in the form of a collar having peripheral scallops 56 (see FIG. 2), is attached, such as by brazing, to one of the extension tubes 26 below the lower surface 58 of the adapter late 30 so as to limit downward slidable movement of the adapter plate 30 along the tube 26. Each upper retainer 50, also being in the form of a collar, encircles the upper end of the extension tube 26 and is sized to fit in the counterbore 42 of the passageway 38 in the upper bearing plate 34. The upper retainer 50 has an internal annualar groove 60 and is attached to the upper end of the extension tube 26 by circumferentially bulging an annular portion 62 of the tube 26 into the annular groove 60. As can be appreciated, the abutting engagement of the upper surface of the internal ledge 44 in the passageway 38 with the lower edge of the upper retainer 50 limits the upward slidable movement of the upper bearing plate 34 along the extension tube 26. Finally, for proper alignment of the coil springs 46 and to prevent them from contacting their respective extension tubes 26, a spring seat 64 is provided on the lower end of each coil spring 42 which sets in a counter-bore 66 provided about the through hole 36 in the upper surface 52 of the lower adapter plate 30.

In view of the preceding description of the top nozzle 22, it will be realized that it has many components to assemble together. For instance, in the embodiment of the top nozzle 22 illustrated in FIGS. 1 through 4, wherein the fuel assembly 10 is of the type having a square array of fuel rods 18 with sixteen control rod guide thimbles 14 strategically arranged within the fuel rod array, there are sixteen extension tubes 26, one enclosure 28, one upper bearing plate 34, sixteen coil springs 46, sixteen lower retainers 48, sixteen upper retainers 50 and sixteen spring seats 64. In order to ensure ease and reliability in assembling these components into a completed subassembly, the top nozzle preassembling apparatus of the present invention, being generally designated by the numeral 68, is advantageously utilized.

Apparatus for Preassembling Components Into Top Nozzle Subassembly

Figure 2:
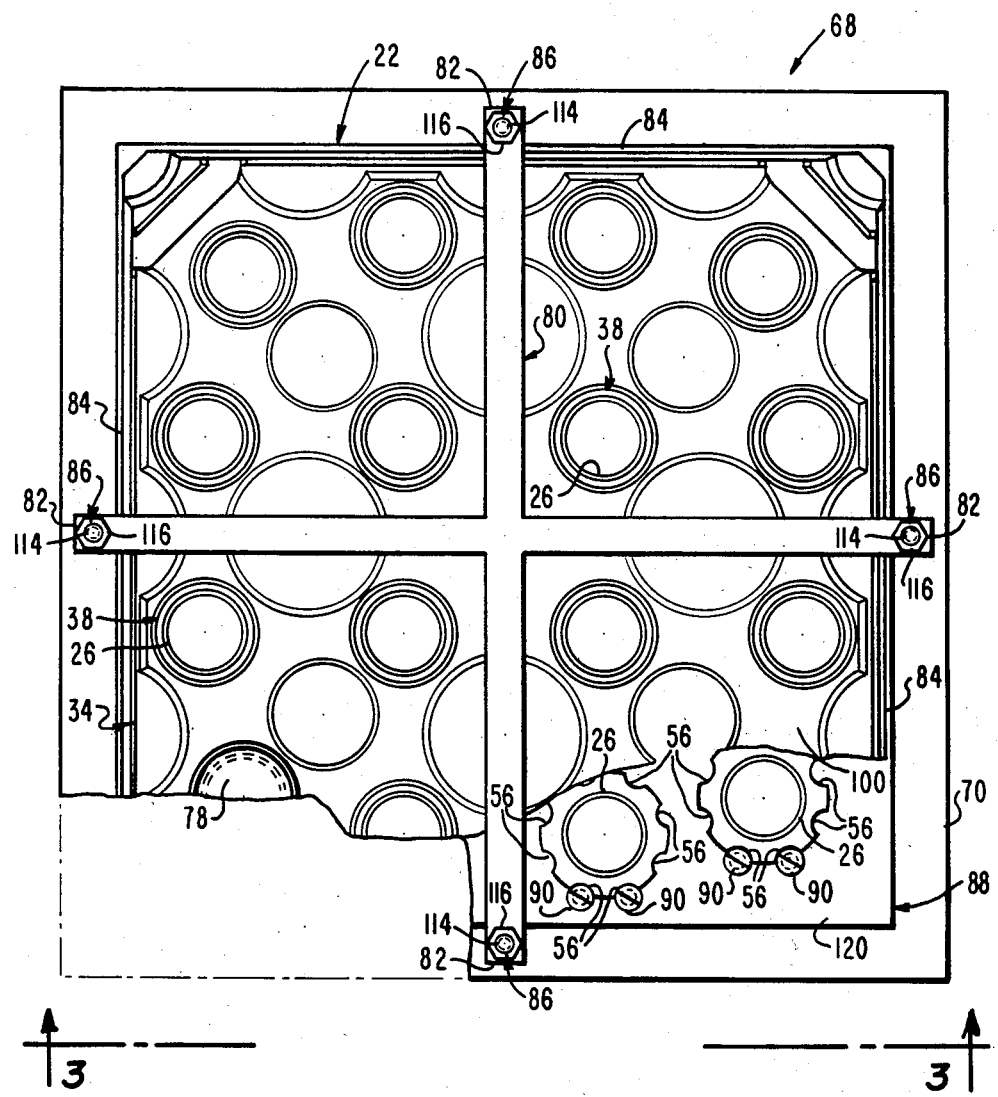
FIG. 2 is a top plan view of the top nozzle preassembling apparatus of the present invention, with an upper cruciform loading plate of the apparatus shown resting on the upper bearing plate of the top nozzle and with portions of the top nozzle components broken away to expose two of the lower retainers on the extension tubes and a pair of alignment screws on a lower orientation plate of the apparatus which extend into a pair of the peripheral scallops on the retainers for orienting them in correct radial positions.
Figure 3:
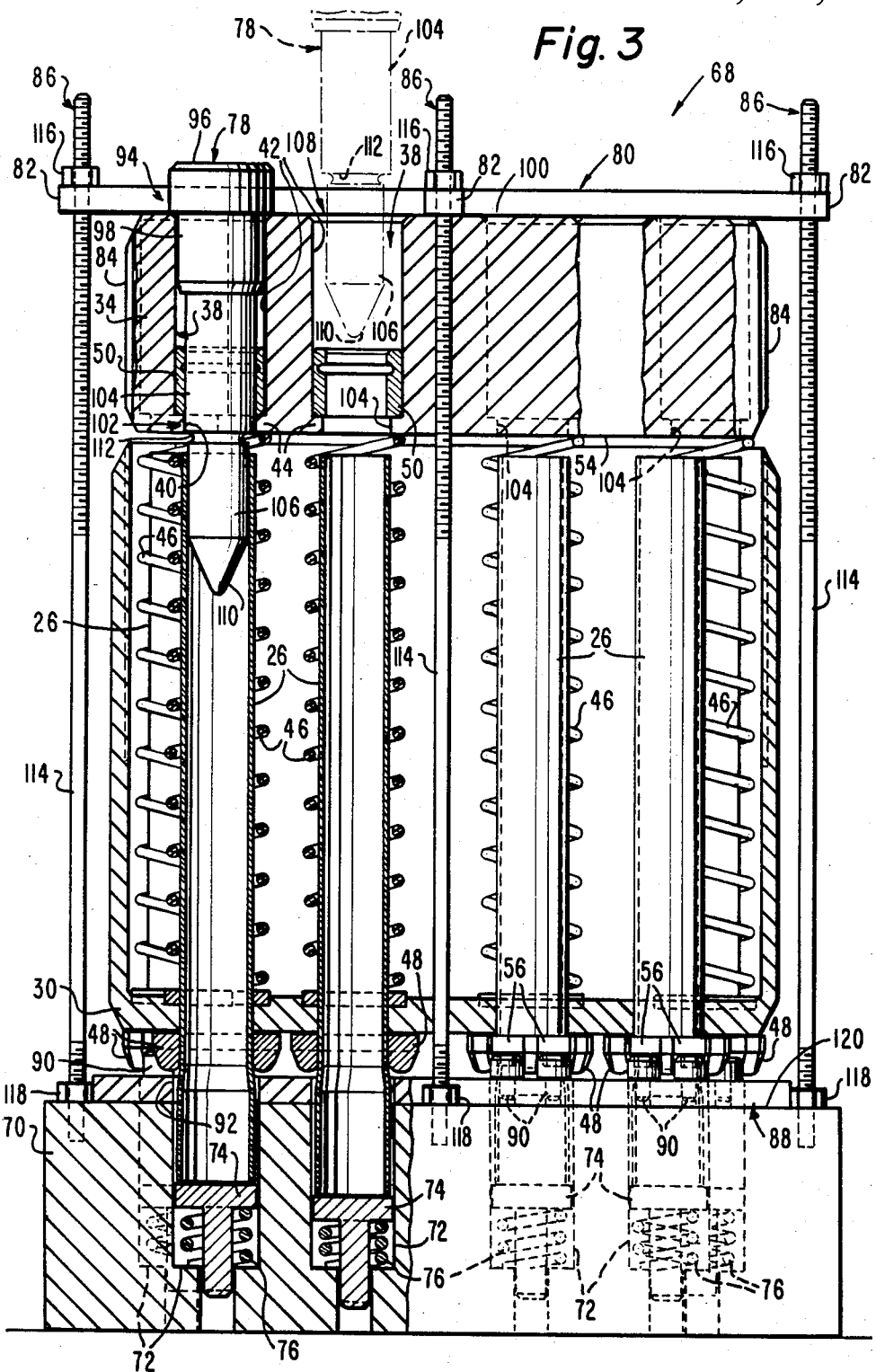
FIG. 3 is a side elevational view of the top nozzle preassembling apparatus as seen along line 3—3 of FIG. 2, showing the apparatus prior to preloading the coil springs into a state of compression between the upper bearing and lower adapter plates of the top nozzle and attaching the upper retainers to the upper ends of the extensions tubes within the passageways in the upper bearing plate.
Figure 4:
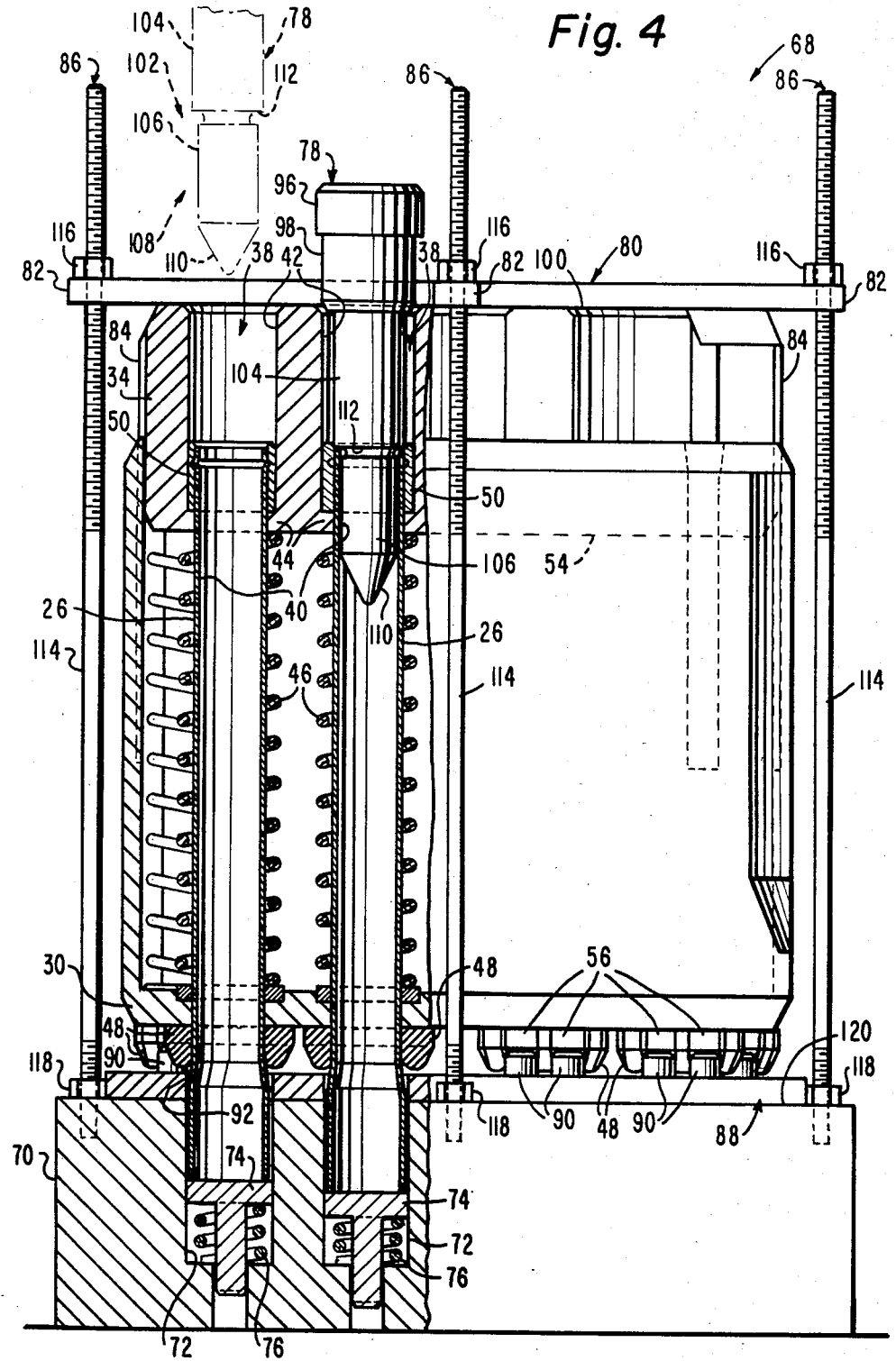
FIG. 4 is a side elevational view of the top nozzle preassembling apparatus similar to that of FIG. 3, but showing the apparatus after the springs have been preloaded and at least one of the upper retainers attached to the upper end of one extension tube.

Turning now to FIGS. 2 through 4, there is illustrated the apparatus 68 of the present invention for preassembling and maintaining the extension tubes 26 and other above-described components of the top nozzle 22 together so that they can be applied later as a completed subassembly to the upper ends of the guide thimbles 14 of the fuel assembly 10. In such manner, the top nozzle 22 can be more easily and precisely mounted to the guide thimbles 14.

The preassembling apparatus 68 basically includes a generally rectangular platform or base 70 having a plurality of bores 72 defined therein in a pattern which matches that of the guide thimbles 14 in the fuel assembly 10, and compliant means in the form of a piston 74 yieldably supported by a spring 76 in each of the bores 72 of the base 70. Also, the apparatus 68 includes locating means in the form of a plurality of pins 78 (also seen in FIG. 5) being disposable through the respective passageways 38 of the upper bearing plate 34 and into the upper ends of the respective extension tubes 26 for aligning the passageways 38 individually with the respective extension tubes 26 and for guiding the extension tube upper ends into the passageways. Further, loading means are employed in the apparatus 68 in the form of a cruciform loading plate 80 disposable on the upper bearing plate 34 with a plurality of end portions 82 which extend respectively adjacent different lateral sides 84 of the bearing plate 34 and a plurality of adjustable members 86 extending between and interconnecting the base 70 and the respective end portions 82 of the loading plate 80. The members 86 are individually adjustable for applying a separate loading force component at each lateral side of the upper bearing plate 34 for leveling the position of the bearing plate 34 concurrently as the upper bearing plate 34 is moved toward the lower adapter plate 30 in compressing the coil springs 46 which surround the extension tubes 26 between the plates 30,34. Finally, the preassembling apparatus 68 has orientation means in the form of a generally rectangular orientation plate 88 (also seen in FIG. 6) disposable between the base 70 and the lower adapter plate 30, and at least a pair of alignment pins 90 mounted upon and extending upward from the orientation plate 88 adjacent each of a plurality of openings 92 defined through the plate for receiving the respective extension tubes 26. Each pair of alignment pins 90 is used to define the desired radial position of the lower retainer 48 on each one of the extension tubes 26.

In order to properly assemble the top nozzle components, four interface requirements must be met through the functioning of the preassembling apparatus 68 briefly described above. First, the lower retainers 48 fixed to the extension tubes 26 must all contact the lower surface of the adapter plate 30 to eliminate potential for load maldistribution. Second, the plurality of extension tubes 26 must be simultaneously inserted into the passageways 38 in the upper bearing plate 34 as the bearing plate is lowered in place within the enclosure sidewall 32 against the coil springs 46. Third, means must be provided to compress the hold-down coil springs 46, allow adjustment for leveling the upper bearing plate 34 and provide access for expanding the upper ends of the extension tubes 26 into the upper retainers 50. Fourth, means must be provided to radially orient the lower retainers 48 so as to align their respective peripheral scallops 56 with fuel rods 18 grouped about each guide thimble 14 of the fuel assembly 10 so that the fuel rods may be removed and replaced during reconstitution of the fuel assembly.

The first requirement is substantially met by the cooperative functioning of the bores 72 in the base 70 and the spring-loaded pistons 74 mounted in the bores of the base. Each of the bores 72 are of a size adapted to receive a lower end of one of the plurality of extension tubes 26. Each of the spring-loaded pistons 74 yieldably supports one extension tube 26 for vertical movement when the tubes 26 are slidably received through the respective holes 36 in the lower adapter plate 30. Thus, with all of the lower retainers 48 being attached to the respective extension tubes 26 below the lower surface 54 of the adapter plate 30 so as to limit downward slidable movement of the adapter plate 30 along the tubes 26, the tubes are allowed to vertically move independently of one another until all of their respective lower retainers 48 are brought individually into engagement with the lower surface 58 of the adapter plate 30. When all lower retainers 48 have engaged the adapter plate 30, the adapter plate is then supported substantially uniformly by all of the lower retainers.

Referring to FIGS. 3 and 4, when the upper bearing plate 34 is depressed downwardly toward the coil springs 46 and the lower adapter plate 30, the springs 46 in turn force the adapter plate 30 downwardly against the lower retainers 48 on the tubes 26. Naturally, due to normal tolerances some of the retainers 48 will be located at slightly higher elevations than others, so the adapter plate lower surface 58 will engage the higher retainers 48 first. The soft compliance provided by the spring-loaded pistons 74 allows the tubes 26 mounting those higher retainers to move downward relative to the tubes mounting the other retainers until the adapter plate has contacted these other retainers. Thus, as seen in FIGS. 3 and 4, certain of the spring-loaded pistons 74, such as the sectioned one on the right in the figures, will be depressed more that others, such as the sectioned one on the left in the figures. While the soft compliance illustrated is in the form of springs 76, other types could be used, such as stacked belleville washers, rubber, etc.

Figure 5:
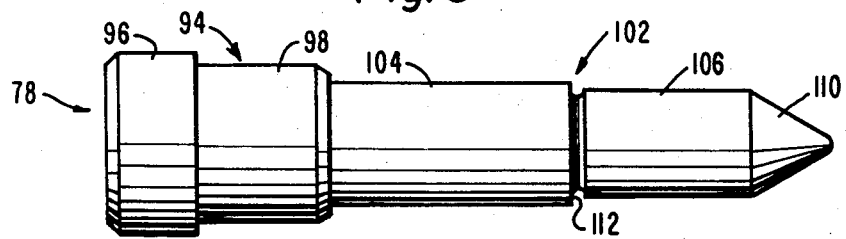
FIG. 5 is a side view of one of the locating pins of the preassembling apparatus for aligning the upper end of one extension tube with one passageway in upper bearing plate as seen in FIG. 3 and guiding the extension tube upper end into the passageway to the position seen in FIG. 4 concurrently as the coil springs are being preloaded by adjustably moving the cruciform loading plate toward the base of the apparatus.

The second requirement is substantially met by the functions performed concurrently by the plurality of locating pins 78. Each of the pins 78, as seen in FIGS. 3 through 5, includes an upper portion, generally indicated at 94, made up of a head 96 and a neck 98 which seat the pin in a stationary position relative to the upper bearing plate 34. Since the respective diameters of the head 96 and neck 98 are respectively larger and smaller than that of the counterbore 42, the head 96 will rest on the upper surface 100 of the upper bearing plate 34, while the neck 98 will extend within the counterbore 42. Further, each of the pins 78, includes a lower portion, generally indicated at 102, made up of an upper body 104 and a lower body 106 which are disposable through the upper counterbore 42 and lower bore 40 and extendable into the upper end of one of the extension tubes 26 so as to define a guideway or entry channel 108 (see the pins 78 shown in broken line form in FIGS. 3 and 4) for the extension tube upper end into the one passageway 38 and within the one upper retainer 50 seated therein on the ledge 44. Since the respective diameters of the upper and lower bodies 104,106 are both smaller than the bore 40 and the internal diameter of the upper retainer 50 seated on the ledge 44, both bodies are vertically movable through the passageway 38 and the upper retainer 50. Since the respective diameters of the upper and lower bodies 104,106 of the pin 78 are respectively the same as the outside and inside diameters of the tube 26 the annular space about the lower body 106 occupied by the upper end of the tube 26 defines the aforementioned entry channel 108 for the tube 26 into the passageway 38 as the upper bearing plate 34 is moved downwardly from the relative positions seen in FIG. 3 toward the lower adapter plate 30 and against the bias of the coil springs 46, upon which the upper bearing plate 34 is initially positioned, to the relative positions depicted in FIG. 4.

Although only one locating pin 78 is illustrated in FIGS. 3 and 4, it is to be understood that all of the pins, being sixteen in number in the illustrated embodiment, are inserted into their respective passageways 38 in the upper bearing plate 34 to initially set up the apparatus 68. Specifically, when the upper bearing plate 34 is initially set on the hold-down springs 46, a gap exists between the upper ends of the extension tubes 26 and the lower surface 54 of the upper bearing plate 34. When the pins 78 are inserted into the passageways 38, their respective lower bodies 106 project below the lower surface 54 of the bearing plate 34, while their heads 102 seat on the upper surface 100 thereof. The lower body 106 of each pin 78 has a tapered end 110 which leads into the extension tube 26. As the upper bearing plate 34 is depressed or lowered toward the lower adapter plate 30, the upper edge of each extension tube 26 eventually engages the transition 112 between the lower and upper bodies 106,104 and lifts the pin 78 partially out of its respective passageway 38, as depicted in FIG. 4, as the extension tube upper end reaches its desired position within the upper retainer 50 seated in the passageway 38. The pins 78 can then be easily removed from the upper bearing plate 34 and a suitable tool (not shown) inserted into each of the passageways 38 for forming a bulge fitting between the extension tube upper end and the respective upper retainer 50 seated therein.

The third requirement is substantially met by the cooperative functioning of the cruciform loading plate 80 and the adjustable members 86 in the form of elongated rods 114 and adjustable fasteners 116 which interconnect the end portions 82 of the loading plate 80 with separate regions of the base 70, as seen in FIGS. 2 through 4. The cruciform plate 80 is placed in overlying relation on the upper surface 100 of the upper bearing plate 34 and its cruciform configuration allows it to cross the bearing plate without obstructing any of the passageways 38, thereby permitting access to the passageways 38 by the locating pins 78 and bulging tools (not shown). The shape of the loading plate 80 also facilitates the imposition at the lateral sides 84 of the upper bearing plate 34 of respective separate components of the loading force required to cause downward movement of the upper bearing plate 34 against the bias of the coil springs 46 and toward the lower adapter plate 30. With such manner of applying the loading force, leveling of the position of the upper bearing plate 34 relative to the lower adapter plate 30 can be carried out concurrently as the coil springs 46 are being placed in a state of compression between the plates 30,34 and the upper ends of the extension tubes 26 are being inserted into the upper retainers 50 in the passageways 38 of the upper loading plate 34.

Referring to FIGS. 3 and 4, the four threaded studs or rods 114 both penetrate the outer end portions 82 of the loading plate 80 at their upper ends and are threaded into and locked by nuts 118 to the base 70 at their lower ends. By advancing the threaded fasteners 116 on the upper ends of the rods 114, the loading plate 80 and therewith the upper bearing plate 34 are both drawn downward toward the adapter plate 30. Levelness of the bearing plate 34 can readily be controlled as the downward advancement thereof proceeds. Once the correct height of the bearing plate 34 above the adapter plate 30 is reached, such as seen in FIG. 4, the locating pins 78 are removed and a suitable bulge tool (not shown) is used to expand the upper ends of the extension tubes 26 into the respective upper retainers 50.

Figure 6:
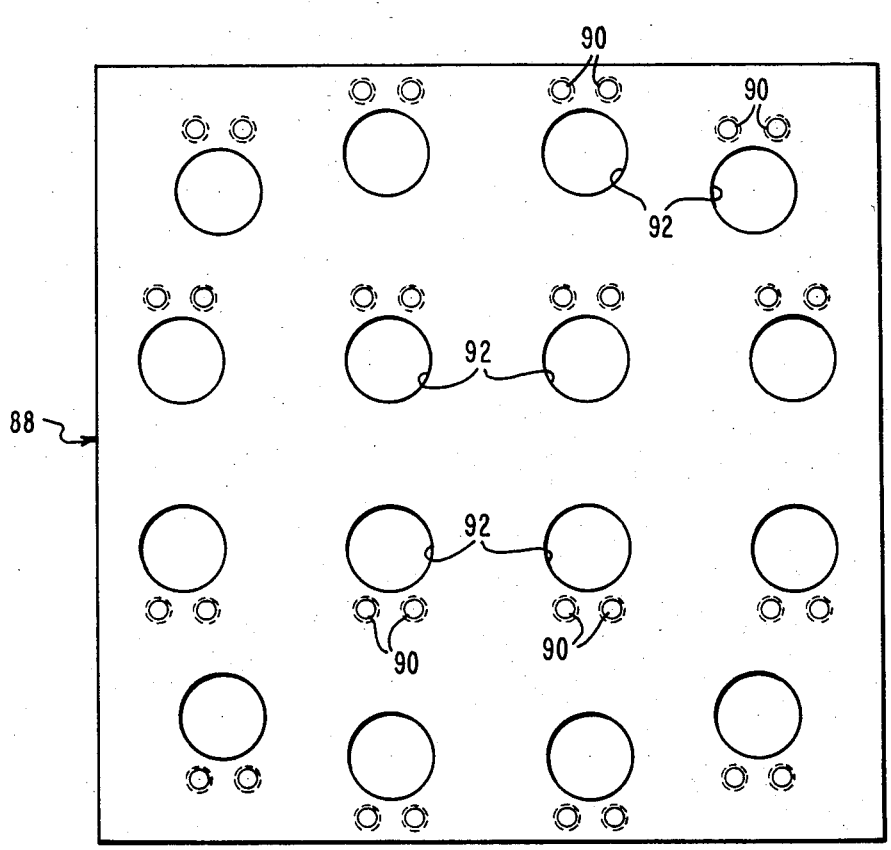
FIG. 6 is a bottom plan of the lower orientation plate of the top nozzle preassembling apparatus.

The fourth requirement is substantially met by the function performed by the orientation plate 88 and plurality of pairs of alignment pins 90 thereon. The alignment pins 90 provide a visual go/no go check to ensure that the radial orientation or positions of the extension tubes 26 and the scallop-bearing lower retainers 48 fixed thereto are correct. The orientation plate 88 of FIG. 6 is disposed between the upper surface 120 of the base 70 and the lower surface 58 of the lower adapter plate 30. In the illustrated embodiment, the plate 88 contains sixteen openings 92 through which the extension tubes 26 extend. Also, two alignment pins 90 are located adjacent to each of these sixteen openings 92. These pins 90 are positioned such that when the upper bearing plate 34 is lowered, the heads of the pins 90 must penetrate a pair of the scallops 56 defined on the periphery of the respective lower retainers 48. If a given retainer 48 is out of radial position, it will contact the heads of corresponding pair of pins 90, giving a direct visual indication of misalignment. Then, corrective action requiring merely the rotation of the offending extension tube 26 can be taken immediately.

It is readily apparent, therefore, that the preassembling apparatus 68 as described heretofore includes sufficient operative devices which cooperate together to meet the four previously-outlined requirements for achieving proper assembly of the top nozzle components into a completed subassembly ready for later application to the skeleton of a fuel assembly.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An apparatus for preassembling a top nozzle subassembly for latter mounting on a plurality of guide thimbles of a fuel assembly said preassembling apparatus comprising:
   (a) a base having a plurality of bores defined therein in a pattern which matches that of said guide thimbles, each of said bores being adapted to receive a lower end of one of a plurality of guide thimble extension tubes;
   (b) compliant means disposed in said bores of said base and being yieldable to support said extension tubes individually for vertical movement when said tubes are slidably received through respective holes being defined in a lower adapter plate in said pattern which matches that of said guide thimbles and have respective lower retainers attached thereto below said adapter plate which limit downward slidable movement of said adapter plate along said extension tubes, whereby said extension tubes are allowed to vertically move independently of one another until all of their respective lower retainers are brought individually into engagement with a lower surface of said adapter plate for supporting the same uniformly by all of said lower retainers;
   (c) locating means disposable through passageways being defined in an upper bearing plate in said pattern which matches that of said guide thimbles and extendable into upper ends of said extension tubes for aligning said passageways individually with said respective extension tubes and guiding said extension tube upper ends into said passageways when said upper bearing plate is supported on a plurality of coil springs being disposed about said respective extension tubes and on said lower adapter plate and said bearing and adapter plates are moved relatively toward one another and against the bias of said coil springs so as to compress the same; and
   (d) loading means operable to generate a force which causes relative movement of said upper bearing and lower adapter plates toward one another and compression of said coil springs therebetween when said bearing plate is supported on said coil springs and said locating means are disposed through said passageways of said bearing plate and extend into said upper ends of said extension tubes, whereby said upper ends of said extension tubes are brought into said passageways of said upper bearing plate for attachment to upper retainers for limiting upward slidable movement of said upper bearing plate relative to said extension tubes and thereby holding said coil springs in a state of compression between said lower adapted and upper bearing plates.

2. The preassembling apparatus as recited in claim 1, wherein said compliant means includes:
   a plurality of pistons, each piston being disposed within one of said bores in said base for supporting an individual one of said extension tubes at its lower end for reciprocable vertical movement relative to said adapter plate; and
   a plurality of springs, each spring being operatively coupled to one of said pistons and said base for yieldably biasing said one piston in an upward direction.

3. The preassembling apparatus as recited in claim 1, wherein said locating means includes:
   a plurality of individual pins, each pin having
   an upper portion for seating said pin in a stationary position relative to said upper bearing plate and through one of said passageways therein, and
   a lower portion disposable through said one passageway and extendable into the upper end of one of said extension tubes for defining an entry channel for the upper end of said one extension tube into said one passageway in said upper bearing plate.

4. The preassembling apparatus as recited in claim 1, wherein said loading means includes:
   means overlying said upper bearing plate and engaged therewith; and
   means interconnecting said overlying means and said base and being adjustable for causing movement of said overlying means toward said base and thereby movement of said upper bearing plate therewith toward said lower adapter plate and compression of said coil springs between said lower adapter and upper bearing plates.

5. The preassembling apparatus as recited in claim 4, wherein:

said overlying means is in the form of a cruciform loading plate having a plurality of end portions which extend respectively adjacent different lateral sides of said upper bearing plate; and said interconnecting means is in the form of a plurality of elongated rods with adjustable fasteners, each rod extending between said base and one of said loading plate end portions, each fastener being individually adjustable on one of said rods for applying a separate loading force at each lateral side of said upper bearing plate adjacent said respective one end portion of said loading plate, whereby a leveling adjustment of the position of said upper bearing plate relative to said lower adapter plate can be made concurrently as said springs are compressed between said lower adapter and upper bearing plates.

6. The preassembling apparatus as recited in claim 1, further comprising:

(e) orienting means disposed between said base and the lower surface of said adapter plate for ensuring that each of said extension tubes and its respective lower retainer are disposed in a desired radial position in which peripheral scallops on each of said lower retainers are aligned with a plurality of fuel rods of said fuel assembly surrounding each guide thimble.

7. The preassembling apparatus as recited in claim 6, wherein said orienting means includes:

an orientation plate disposed between said base and the lower surface of said adapter plate, said plate having defined therein a plurality of openings for receiving said respective extension tubes; and at least a pair of alignment pins mounted upon and extending upward from said orientation plate adjacent each of said openings therein for defining the desired radial positions of said lower retainers on said respective extension tubes.

8. An apparatus for preassembling a top nozzle subassembly for later mounting on a plurality of guide thimbles of a fuel assembly wherein said subassembly includes an enclosure having a lower adapter plate and an upstanding sidewall surrounding the periphery thereof, an upper bearing plate receivable within the 4 enclosure sidewall in spaced relation above the lower adapter plate, said lower adapter plate having a plurality of holes defined therethrough in a pattern which matches that of said guide thimbles and said upper bearing plate having a plurality of passageways defined therethrough in a pattern which matches that of said holes of said adapter plate for alignment of pairs of passageways and holes when said bearing plate is received within said enclosure sidewall, a plurality of guide thimble extension tubes having lower and upper ends and being slidably receivable through said aligned pairs of passageways and holes, a plurality of coil springs disposable about said respective extension tubes between said lower adapter and upper bearing plates, and a plurality of pairs of lower and upper retainers, said lower retainers being attachable to said respective extension tubes adjacent the lower ends thereof below said lower adapter plate for limiting downward slidable movement of said adapter plate relative to said extension tubes and said upper retainers being attachable to said respective extension tubes adjacent the upper ends thereof proximate said passageways of said upper bearing plate for limiting upward slidable movement of said bearing plate relative to said extension tubes, said coil springs being held in a state of compression between said lower adapter and upper bearing plates when said lower and upper retainers are attached to said extension tubes, said preassembling apparatus comprising:

(a) a base having a plurality of bores defined therein in a pattern which matches that of said guide thimbles, each of said bores being adapted to receive the lower end of one of said plurality of guide thimble extension tubes;

(b) compliant means disposed in said bores of said base and being yieldable to support said extension tubes individually for vertical movement when said tubes are slidably received through said respective holes in a lower adapter plate and have said respective lower retainers attached thereto below said adapter plate whereby said extension tubes are allowed to vertically move independently of one another until all of their respective lower retainers are brought individually into engagement with said adapter plate for supporting the same uniformly by all of said lower retainers;

(c) a plurality of locating pins, each pin being disposable through one of said passageways in said upper bearing plate and extendable into the upper end of one of said extension tubes for aligning said one passageway with said one respective extension tube and guiding said one extension tube upper end into said one passageway when said upper bearing plate is supported on said plurality of coil springs disposed about said respective extension tubes and on said lower adapter plate and said bearing and adapter plates are moved relatively toward one another and against the bias of said coil springs so as to compress the same;

(d) a loading plate positionable on said upper bearing plate and having a plurality of end portions which extend respectively adjacent different lateral sides of said bearing plate; and (e) a plurality of adjustable members, each member extending between and interconnecting said base and one end portion of said loading plate and being individually adjustable for applying a separate loading force at its respective lateral side of said upper bearing plate such that a leveling adjustment of the position of said upper bearing plate relative to said lower adapter plate can be carried out concurrently with movement of said upper bearing plate toward said lower adapter plate and compression of said coil springs therebetween when said bearing plate is supported on said coil springs and said locating pins are disposed through said passageways of said bearing plate and extend into said upper ends of said extension tubes, whereby said upper ends of said extension tubes are brought into said passageways of said upper bearing plate for attachment to said upper retainers which limits upward slidable movement of said upper bearing plate relative to said extension tubes and thereby holds said coil springs in a state of compression between said lower adapter and upper bearing plates.

9. The preassembling apparatus as recited in claim 8, wherein each locating pin includes:

an upper portion for seating said pin in a stationary position relative to said upper bearing plate and through said one passageway therein; and a lower portion disposable through said one passageway and extendable into the upper end of said one extension tube for defining an entry channel for the upper end of said one extension tube into said one passageway in said upper bearing plate.

10. The preassembling apparatus as recited in claim 9, wherein said compliant means includes:
   a plurality of pistons, each piston being disposed within one of said bores in said base for supporting an individual one of said extension tubes at its lower end for reciprocable vertical movement relative to said adapter plate; and
   a plurality of springs, each spring being operatively coupled to one of said pistons and said base for yieldably biasing said one piston in an upward direction.

11. The preassembling apparatus as recited in claim 8, further comprising:
   (f) orienting means disposed between said base and said adapter plate for ensuring that each of said extension tubes and its respective lower retainer are disposed in a desired radial position in which peripheral scallops on each of said lower retainers are aligned with a plurality of fuel rods of said fuel assembly surrounding each guide thimble.

12. The preassembling apparatus as recited in claim 11, wherein said orienting means includes:
   an orientation plate disposed between said base and said adapter plate, said plate having defined therein a plurality of openings for receiving said respective extension tubes; and
   at least a pair of alignment pins mounted upon and extending upward from said orientation plate adjacent each of said openings therein for defining the desired radial positions of said lower retainers on said respective extension tubes.

13. A method for preassembling a top nozzle subassembly for later mounting on a plurality of guide thimbles of a fuel assembly, said preassembling method comprising the steps of:
   (a) yieldably supporting a plurality of guide thimble extension tubes individually at their respective lower ends for vertical movement when said tubes are slidably received through respective holes being defined in a lower adapter plate in a pattern which matches that of said guide thimbles and have respective lower retainers attached thereto below said adapter plate which limit downward slidable movement of said adapter plate along said extension tubes, whereby said extension tubes are allowed to vertically move independently of one another until their respective lower retainers are brought individually into engagement with a lower surface of said adapter plate for supporting the same uniformly by all of said lower retainers;
   (b) aligning individual passageways being defined in an upper bearing plate in said pattern which matches that of said guide thimbles with individual upper ends of said respective extension tubes;
   (c) guiding said extension tube upper ends into said passageways when said upper bearing plate is supported on a plurality of coil springs being disposed about said respective extension tubes and on said lower adapter plate and said bearing and adapter plates are moved relatively toward one another and against the bias of said coil springs so as to compress the same; and
   (d) generating a loading force which causes relative movement of said upper bearing and lower adapter plates toward one another and compression of said coil springs therebetween when said bearing plate is supported on said coil springs and said passageways are aligned with said respective extension tube upper ends, whereby said upper ends of said extension tubes are brought into said passageways of said upper bearing plate for attachment to upper retainers for limiting upward slidable movement of said upper bearing plate relative to said extension tubes and thereby holding said coil springs in a state of compression between said lower adapter and upper bearing plates.

14. The preassembling method as recited in claim 13, further comprising the step of:
   (e) orienting each of said extension tubes and its respective lower retainer to ensure that said lower retainer is disposed in a desired radial position in which peripheral scallops on said lower retainer are aligned with a plurality of fuel rods of said fuel assembly surrounding each guide thimble.

15. The preassembling method as recited in claim 13, wherein said loading force generating step includes:
   generating a plurality of separate components of said loading force at each lateral side of said upper bearing plate such that a leveling adjustment of the position of said upper bearing plate relative to said lower adapter plate can be made concurrently as said springs are compressed between said lower adapter and upper bearing plates.

* * * * *